(12) United States Patent
Bulthuis et al.

(10) Patent No.: US 7,382,953 B1
(45) Date of Patent: Jun. 3, 2008

(54) FOLDED AWG ARCHITECTURE

(75) Inventors: Hindrick F. Bulthuis, Edinburgh (GB); Gunter B. L. Beelen, Zoutleeuw (BE)

(73) Assignee: Gemfire Corporation, Fremont, CA (US)

( * ) Notice: Subject to any disclaimer, the term of this patent is extended or adjusted under 35 U.S.C. 154(b) by 0 days.

(21) Appl. No.: 11/673,249

(22) Filed: Feb. 9, 2007

(51) Int. Cl.
G02B 6/26 (2006.01)
G02B 6/42 (2006.01)

(52) U.S. Cl. .......................... 385/37; 398/43; 398/79; 398/82

(58) Field of Classification Search ........ 333/207–210, 333/246–252; 343/770–772; 385/1–4, 10–16, 385/88–90, 46, 140
See application file for complete search history.

(56) References Cited

U.S. PATENT DOCUMENTS

| | | | | |
|---|---|---|---|---|
| 4,355,864 A * | 10/1982 | Soref | ......................... | 385/18 |
| 5,002,350 A | 3/1991 | Dragone | | |
| 5,136,671 A * | 8/1992 | Dragone | ......................... | 385/46 |
| 5,396,507 A * | 3/1995 | Kaminow et al. | ............ | 372/20 |
| 5,414,548 A * | 5/1995 | Tachikawa et al. | ........... | 398/87 |
| 5,521,992 A * | 5/1996 | Chun et al. | .................... | 385/14 |
| 5,745,616 A * | 4/1998 | Zirngibl | ........................ | 385/37 |
| 5,748,811 A * | 5/1998 | Amersfoort et al. | .......... | 385/15 |
| 5,822,481 A * | 10/1998 | Mestric | ........................ | 385/46 |
| 5,845,022 A * | 12/1998 | Doerr | ........................... | 385/24 |
| 5,915,054 A * | 6/1999 | Ota | .............................. | 385/46 |
| 5,926,587 A * | 7/1999 | Chen et al. | ................... | 385/14 |
| 6,023,480 A * | 2/2000 | Dragone | ....................... | 372/23 |
| 6,023,544 A * | 2/2000 | Dragone | ....................... | 385/37 |
| 6,049,640 A * | 4/2000 | Doerr | ........................... | 385/15 |
| 6,049,641 A * | 4/2000 | Deacon et al. | ................ | 385/15 |
| 6,055,349 A | 4/2000 | Seino et al. | | |
| 6,058,233 A * | 5/2000 | Dragone | ....................... | 385/46 |
| 6,169,838 B1 * | 1/2001 | He et al. | ..................... | 385/129 |
| 6,282,344 B1 * | 8/2001 | Bergmann et al. | ............ | 385/46 |
| 6,366,378 B1 * | 4/2002 | Tervonen et al. | ............. | 398/87 |
| 6,434,303 B1 * | 8/2002 | Temkin et al. | ................ | 385/43 |
| 6,456,758 B1 * | 9/2002 | Anthony | ....................... | 385/27 |

(Continued)

FOREIGN PATENT DOCUMENTS

EP 0591042 2/1994

(Continued)

OTHER PUBLICATIONS

Kaneko, A.,Recent progress on arrayed-waveguide gratings for WDM applications, Nanostructures and Quantum Dots/WDM Components/VCSELs and Microcavaties/RF Photonics for CATV and HFC Systems, 1999 Digest of the LEOS Summer Topical Meeting Jul. 26-30, 1999 pp. 1129-1130.

(Continued)

Primary Examiner—Frank G. Font
Assistant Examiner—Peter Radkowski
(74) Attorney, Agent, or Firm—Warren S. Wolfeld; Haynes Beffel & Wolfeld LLP (57) ABSTRACT

Roughly described, an AWG has a waveguide array and a region of vertical-only confinement that is shared for both input and output beams of the waveguide array. The AWG layout is such that the input and output beams to and from the waveguide array cross each other within the region of vertical-only confinement.

4 Claims, 12 Drawing Sheets

U.S. PATENT DOCUMENTS

| | | | |
|---|---|---|---|
| 6,477,294 B1 * | 11/2002 | Jansen Van Doorn et al. | 385/24 |
| 6,493,487 B1 * | 12/2002 | Temkin et al. | 385/37 |
| 6,498,878 B1 * | 12/2002 | Ueda | 385/37 |
| 6,553,165 B1 * | 4/2003 | Temkin et al. | 385/46 |
| 6,657,723 B2 * | 12/2003 | Cohen et al. | 356/328 |
| 6,707,550 B1 * | 3/2004 | Georgis et al. | 356/326 |
| 6,768,842 B2 * | 7/2004 | Bulthuis et al. | 385/37 |
| 6,836,594 B2 * | 12/2004 | Hosoi | 385/37 |
| 6,836,600 B2 * | 12/2004 | Doerr | 385/46 |
| 7,068,885 B2 * | 6/2006 | Bidnyk et al. | 385/37 |
| 7,082,231 B2 * | 7/2006 | Joyner et al. | 385/14 |
| 7,082,235 B2 * | 7/2006 | Gunn, III | 385/28 |
| 2002/0001432 A1 * | 1/2002 | Ueda | 385/37 |
| 2002/0181857 A1 * | 12/2002 | Kmoatsu et al. | 385/24 |
| 2005/0013541 A1 * | 1/2005 | Kittaka et al. | 385/37 |
| 2007/0086703 A1 * | 4/2007 | Kirk et al. | 385/37 |

FOREIGN PATENT DOCUMENTS

| | | |
|---|---|---|
| JP | 2004302111 A * | 10/2004 |
| JP | 2005292365 A * | 10/2005 |
| WO | WO 97/23969 | 7/1997 |

OTHER PUBLICATIONS

Smit, Meint K., "PHASAR-based WDM-Devices: Principles, Design and Applications", IEEE Journal of Selected Topics in Quantum Electronics Vol.2, No. 2, Jun. 20, 1996, 15 pages.

* cited by examiner

FOLDED AWG ARCHITECTURE

BACKGROUND

The present invention relates to arrayed waveguide gratings (AWGs), and more particularly to a novel architecture for an AWG.

AWGs, sometimes also known as "phasars" or "phased arrays", are well known components in the optical communications network industry. An AWG is a planar structure comprising an array of waveguides arranged side-by-side which together act like a diffraction grating. AWGs can be used as multiplexers and as demultiplexers, and a single AWG design can commonly be used both as a multiplexer and demultiplexer. The construction and operation of such AWGs is well known in the art. See for example, "PHASAR-based WDM-Devices: Principles, Design and Applications", M K Smit, IEEE Journal of Selected Topics in Quantum Electronics Vol. 2, No. 2, 20 June 1996, and U.S. Pat. No. 5,002,350 and WO97123969.

Figure 1:
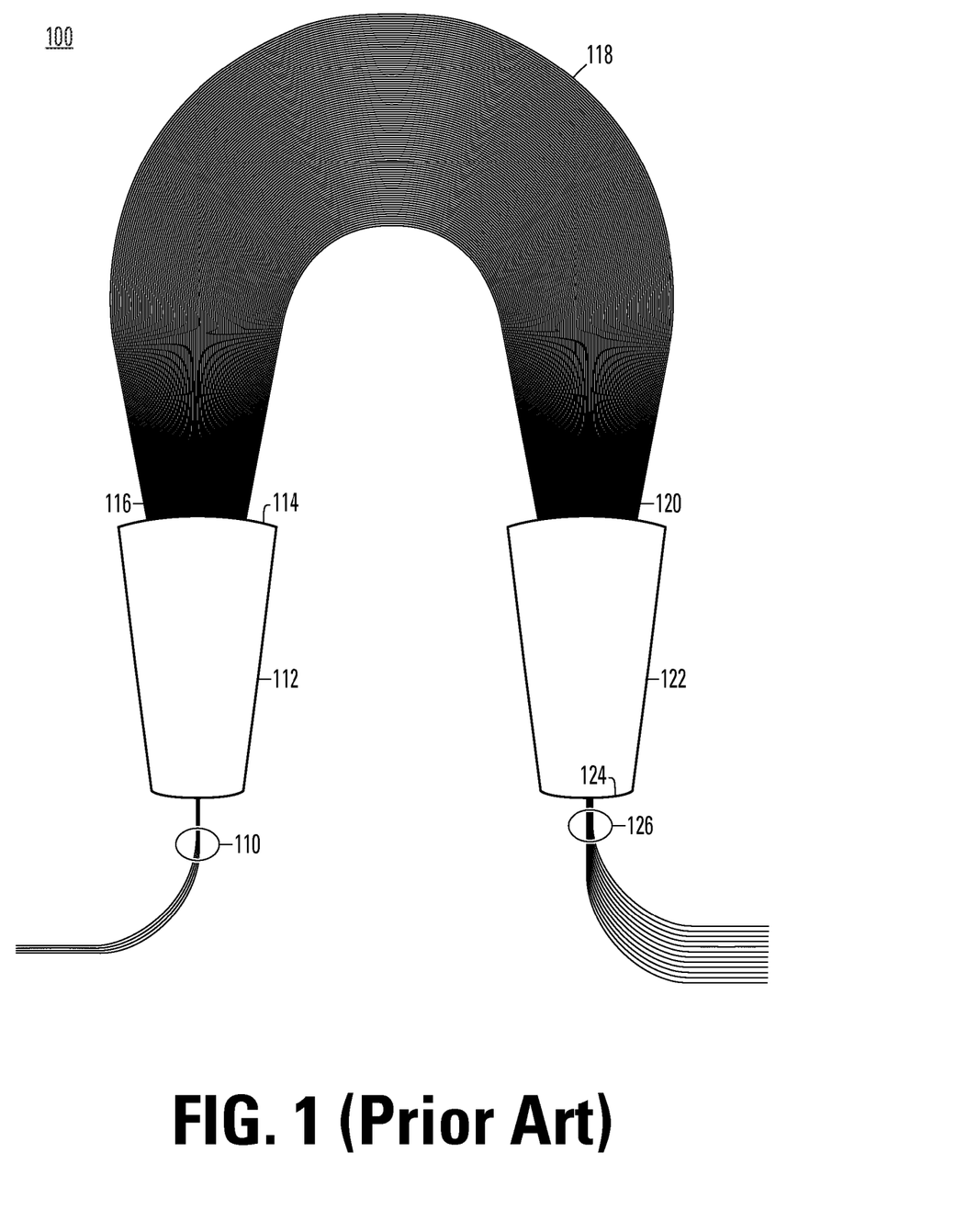
FIG. 1 illustrates the layout of a conventional AWG.

FIG. 1 illustrates the layout of a conventional AWG. It comprises a substrate ("die", "chip") 100 supporting one or more input optical waveguides 110 delivering optical energy into an "input slab" region 112. The slab region is a planar waveguide which confines the input optical energy in only the vertical dimension; the energy is permitted to spread transversely without restriction. The input slab is sometimes referred to herein as an "input free space region", or an "input free propagation region".

An image of the input optical energy (or an interference pattern, if there is more than one input optical waveguide) is developed on the far border 114 of the input slab region 112. At this border the light enters the input end 116 of a waveguide array 118 which consists of tens or hundreds of individual waveguides. The array waveguides (not visible individually in FIG. 1) are of lengths which increase linearly across the array, each waveguide having a length which differs from its nearest adjacent waveguide by a value $\Delta L$.

Optical energy exits the waveguide array 116 at an output end 120 thereof, and delivers the light into an "output slab" region 122. Like the input slab, the output slab region is a planar waveguide which confines the input optical energy in only the vertical dimension. The energy is permitted to spread transversely without restriction, and for that reason the output slab is sometimes referred to herein as an "output free space region", or an "output free propagation region".

A diffraction pattern is developed on the far border 124 of the output slab region 122, where the light enters a set of one or more output optical waveguides 126. The structure can be used as a demultiplexer if there is only one input waveguide 110 and more than one output waveguide 126; in this case information can be carried on multiple channels (wavelengths) in the single input waveguide and the channels are separated out by the AWG for delivery into the different output waveguides. The structure can also be used as a multiplexer if operated in reverse. It can furthermore be used as a router if there are multiple input waveguides 110 and multiple output waveguide 126.

It is frequently desirable to be able to reduce the physical size of an AWG, either to be able to fit more functions on a chip or to fabricate smaller chips. There are physical limits on how small an AWG can be made, however, since waveguide curves must be made gentle enough to maintain their guiding properties. A significant amount of space is also consumed usually by the input and output waveguides which must fan-in or fan-out to direct the light to or from the edges of the chip. There are also additional minimum-size restrictions imposed by the waveguide-to-waveguide length differential $\Delta L$ in the array and the desired number of waveguides in the array, as well as the focal lengths required in the input and output slabs. Other factors may also play a role in thwarting attempts to shrink AWG device designs. It would be desirable if some of these factors could be overcome to enable smaller AWGs.

SUMMARY

According to the invention, roughly described, an AWG has a waveguide array and a region of vertical-only confinement that is shared for both input and output beams of the waveguide array. The AWG layout is such that the input and output beams to and from the waveguide array cross each other within the region of vertical-only confinement.

Particular aspects of the invention are described in the claims, specification and drawings.

BRIEF DESCRIPTION OF THE DRAWINGS

FIG. 9 is a copy of FIG. 4 on which certain output beams have been drawn in.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 2:
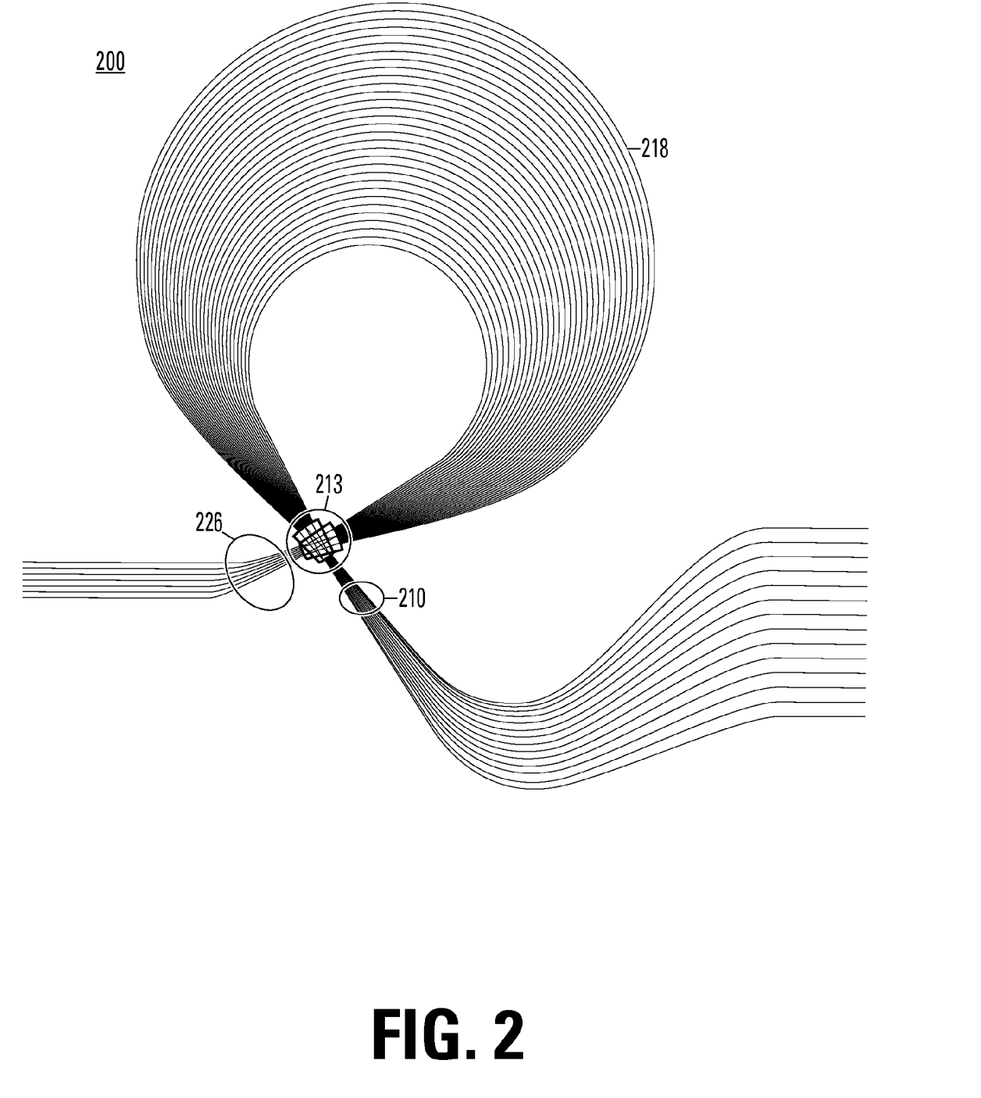
FIGS. 2, 7 and 8 illustrate layouts of AWGs incorporating features of the invention.
Figure 3:
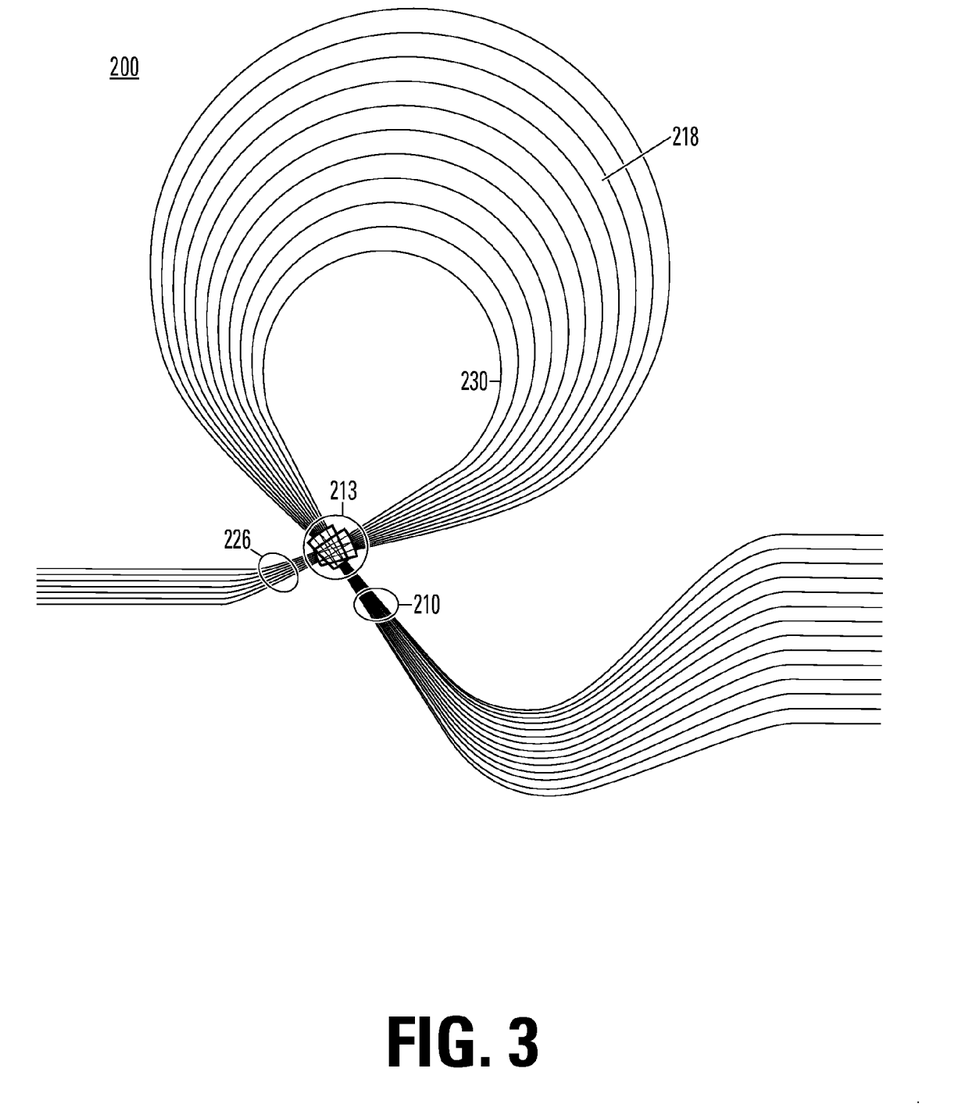
FIG. 3 is a symbolic view of the AWG of FIG. 2, modified to better show individual array waveguides.
Figure 4:
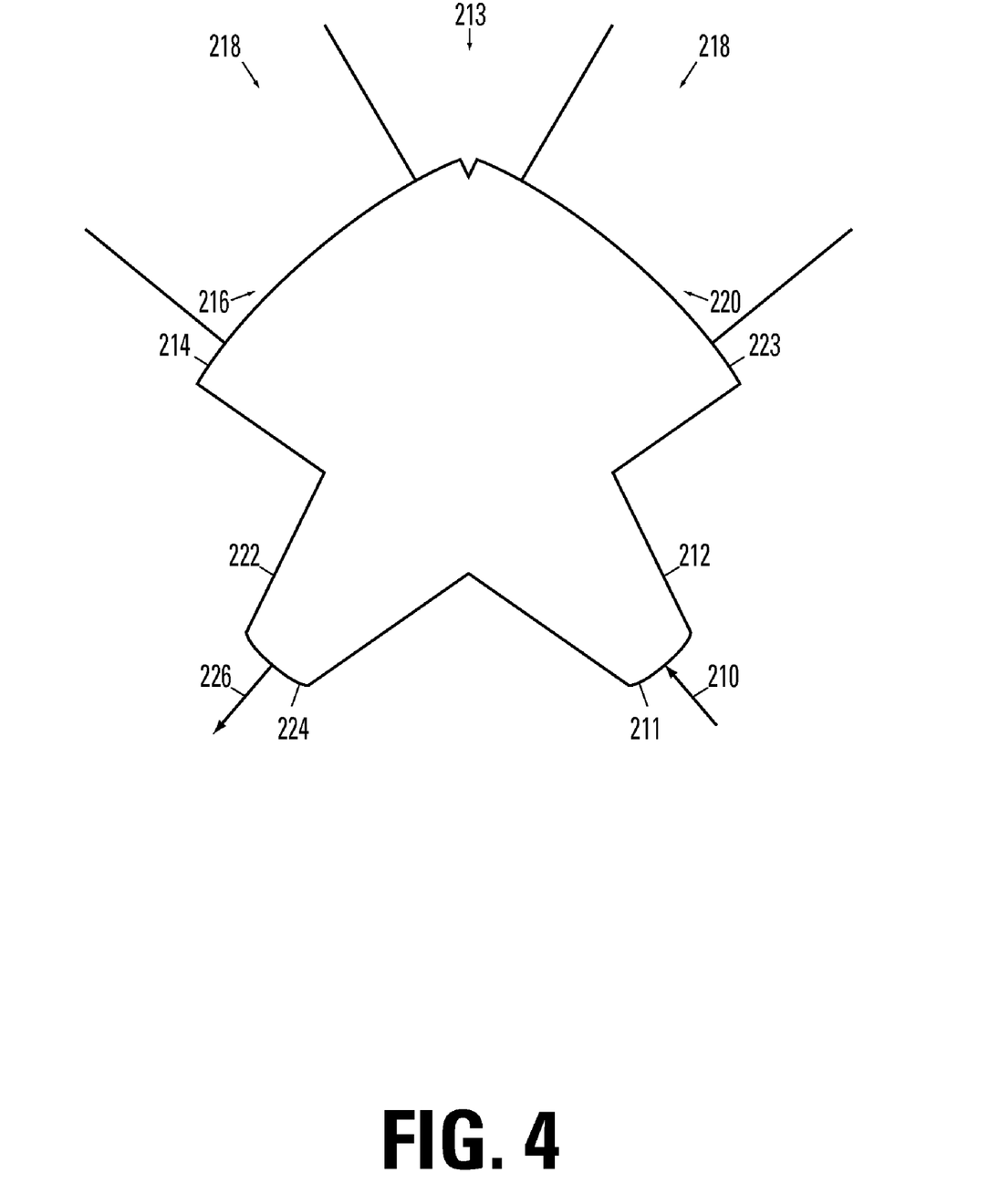
FIG. 4 is an enlarged view of a region in FIGS. 2 and 3.

FIG. 2 illustrates the layout of an AWG incorporating features of the invention. FIG. 3 is a more symbolic view of the AWG of FIG. 2; the number of waveguides in the waveguide array has been reduced for illustration purposes so that they can be discerned individually. FIG. 4 is an enlarged view of the region 213 in FIGS. 2 and 3. As shown in these figures, a chip 200 has formed thereon an input set of optical waveguides 210 disposed and oriented to deliver input optical energy into a slab region 213, and a waveguide array 218 having an input end 216 disposed and oriented to receive optical energy from the input set of optical waveguides after passage across the slab region 213. The waveguide array 218 further has an output end 220 disposed and oriented to deliver optical energy back into the slab region 213. An output set of optical waveguides 226 is disposed and oriented to receive optical energy from the output end 220 of the waveguide array after passage across the slab region 213. At least one of the input and output sets of optical waveguides includes more than one waveguide, and in FIGS. 2-4 they both do. It can be seen that the various waveguides are disposed and oriented such that the input optical energy from the input set of optical waveguides 210 and the output optical energy being delivered to the output optical waveguides 226 cross each other within the slab region 213. The slab region 213 is therefore shared for both input and output beams of the waveguide array 218.

The physical size of the AWG depends in part on the minimum bend radius of the various waveguides in the structure. In the waveguide array portion 218, the minimum bend radius defines the length of the shortest-path waveguide, which is the innermost waveguide 230 (FIG. 3). The minimum radius of each of the other waveguides in the array portion 218 is larger, because each waveguide is longer by the required length increment ΔL than its inner-adjacent waveguide.

Figure 5:
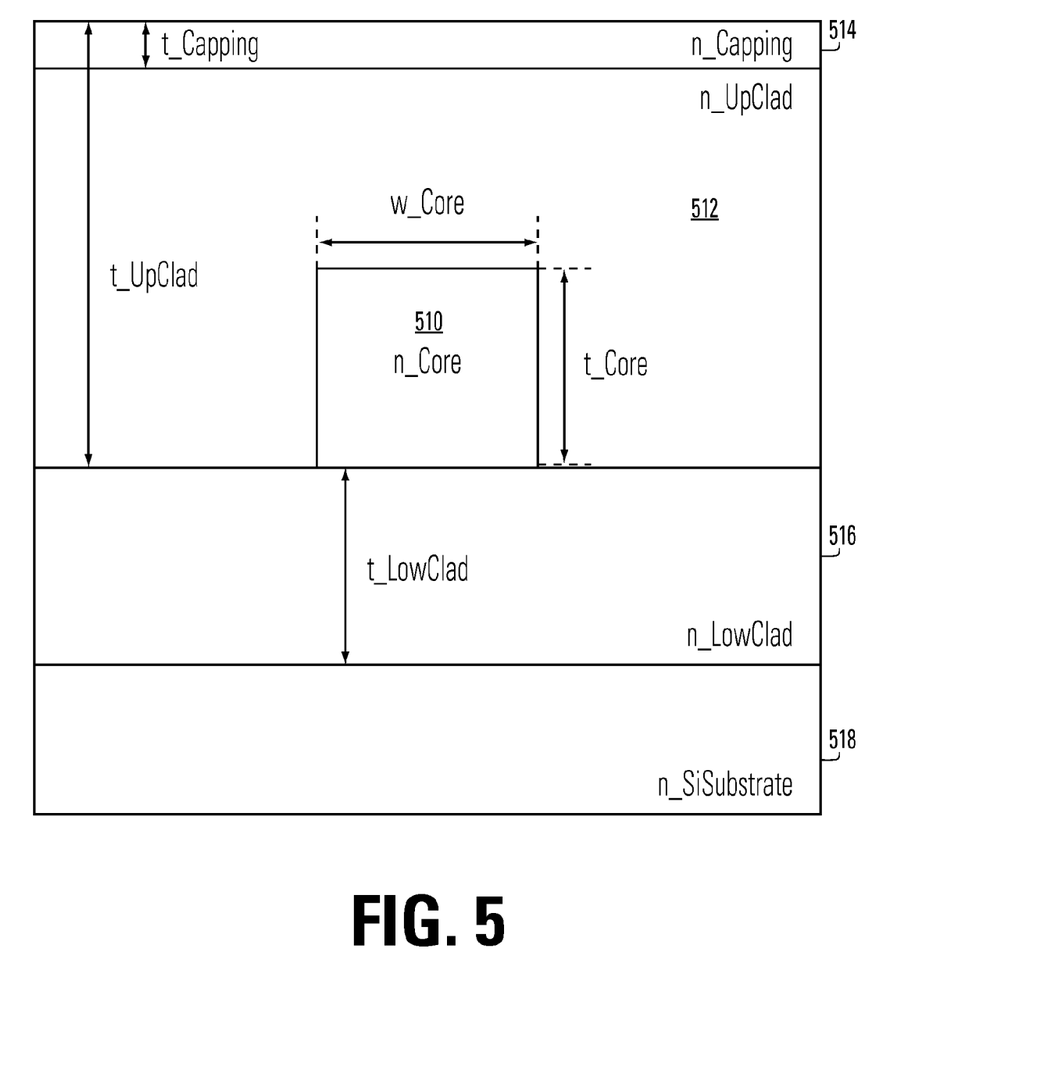
FIG. 5 is a symbolic drawing of a waveguide cross-section.

The minimum bend radius is determined by the allowable loss and the index contrast of the waveguide. Index contrast depends on the waveguide materials and geometry, a cross-section of which is illustrated in FIG. 5. In FIG. 5, the core 510 of a waveguide has an index of refraction n_Core, a width w_Core and a thickness (height) t_Core. It is encapsulated transversely and above by an upper cladding material 512. Cladding material 512 has an index of refraction n_UpClad and a thickness t_UpClad. The top portion 514 of the upper cladding material 512 is a capping layer having an index of refraction n_Capping and a thickness t_Capping. The waveguide core 510 and upper cladding 512 are formed over a lower cladding layer 516, which has an index of refraction N_LowClad and a thickness t_LowClad. Below the lower cladding 516 is a substrate layer 518 which has an index of refraction N_SiSubstrate.

Index contrast is defined as the difference between the core refractive index and the cladding refractive index divided by the core index. In particular:

Contrast=(n_core−max(u_upclad,n_lowclad))/n_core.

For technology having a contrast of approximately 0.8%, materials having the following refractive indexes and geometric dimensions might be used:

| Refractive Indices | |
|---|---|
| n_Core (T = 22, λ = 1.545) | 1.4567 |
| n_Upclad (T = 22, λ = 1.545) | 1.4451 |
| n_LowClad (T = 22, λ = 1.545) | 1.4451 |
| n_SiSubstrate | 3.5 |
| Geometrical Dimensions | |
| w_Core | 5.6 um |
| t_Core | 5.6 um |
| t_Capping | 4 um |
| t_Upclad | 30 um |
| t_Lowclad | 16 um |
| t_SiSubstrate | 675 um (6" wafer) or 725 um (8" wafer) |

Figure 6:
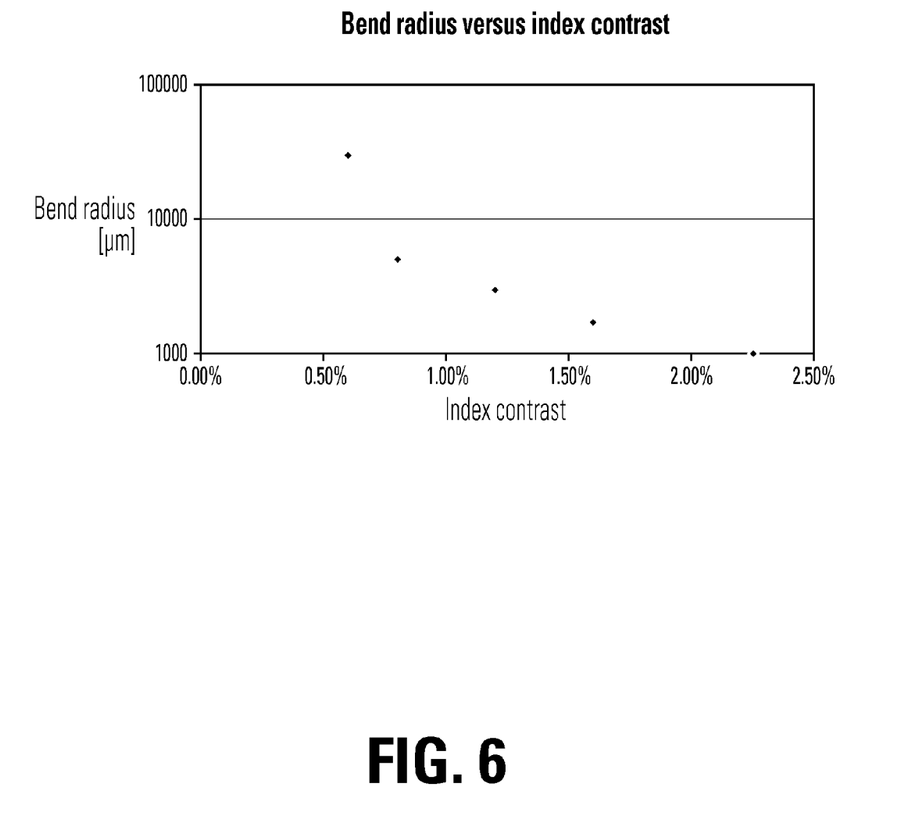
FIG. 6 is a plot illustrating minimum bend radius for a few different values of the index contrast, for a particular loss tolerance.

FIG. 6 is a plot illustrating the minimum bend radius for a few different values of the index contrast, where the loss is to be less than 0.01 dB/cm. For a contrast of 0.8%, a minimum bend radius of 5 mm will keep the loss to less than 0.01 db/cm.

In the embodiment of FIGS. 2, 3 and 4, a minimum bend radius of 2250 um is used. With a total of 57 waveguides (branches) in the waveguide array 218, the use of a shared input-output slab region 213 allows the design of FIGS. 2, 3 and 4 to fit within a 10×15 mm rectangle. This is extremely compact for the stated minimum bend radius.

Figure 7:
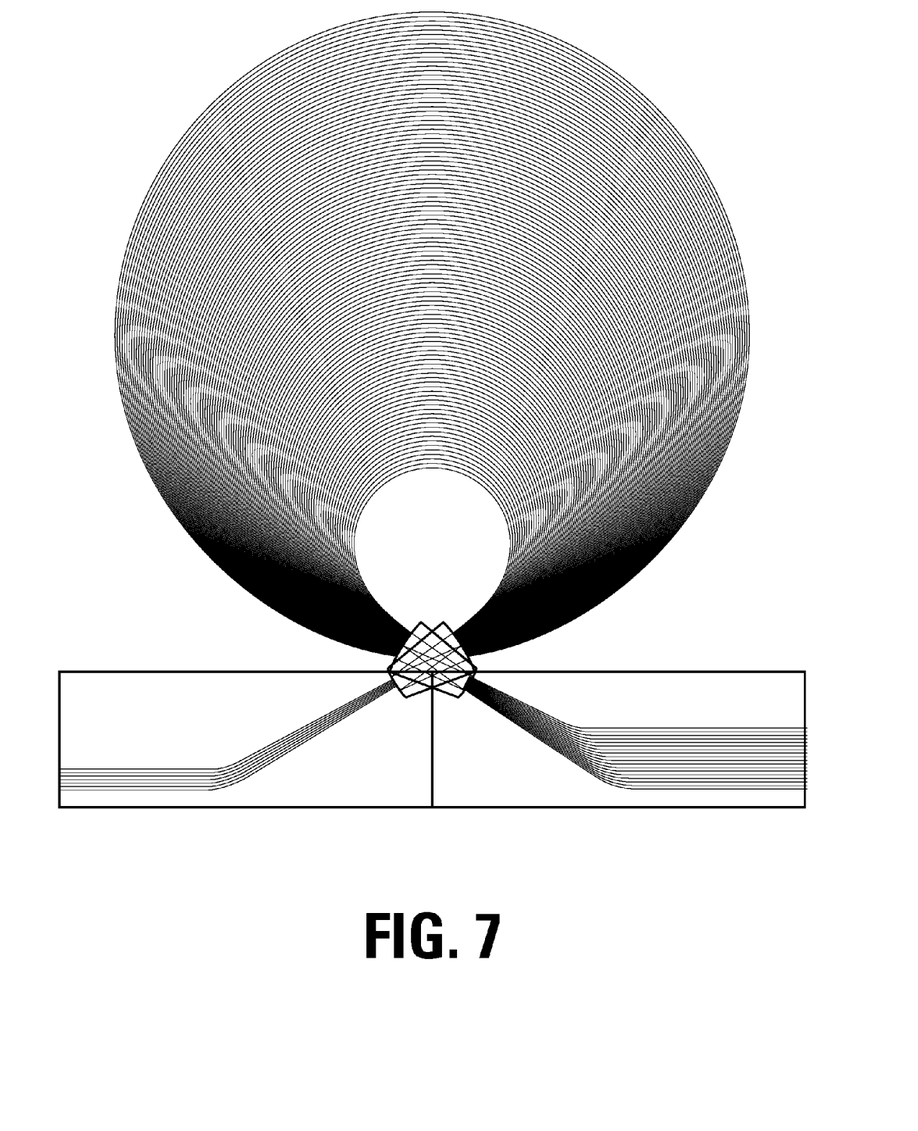
Figure 8:
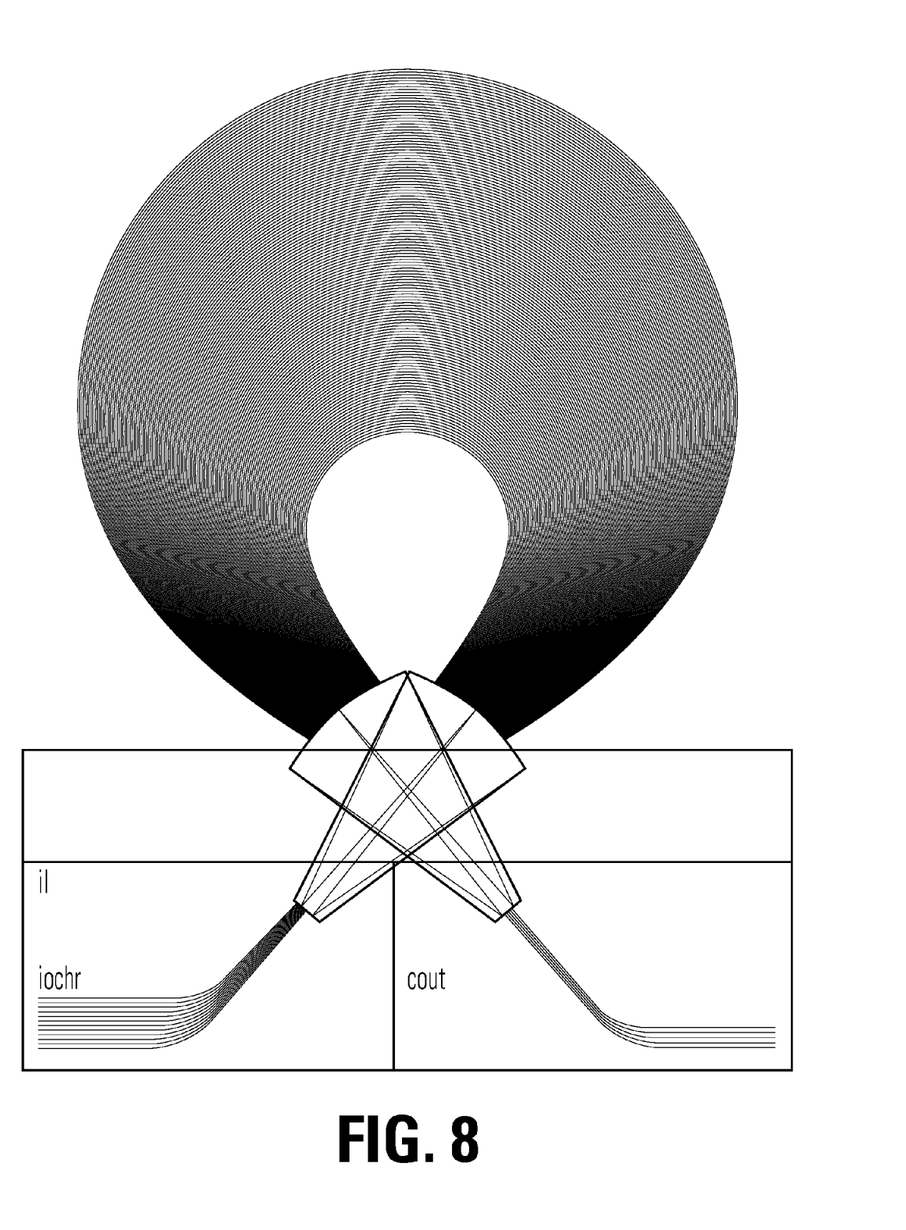

FIGS. 7 and 8 illustrate additional AWG's incorporating features of the invention. Both use the same minimum bend radius of 2250 um. In the design of FIG. 7 the waveguide array contains 165 waveguides and the size of the resulting chip is a compact 20×25 mm. In the design of FIG. 8 the waveguide array contains 455 waveguides, but the length increment between them is much smaller than that of FIGS. 2, 3, 4 and 7. The design of FIG. 8 fits within a chip of only 15×25 mm.

Figure 9:
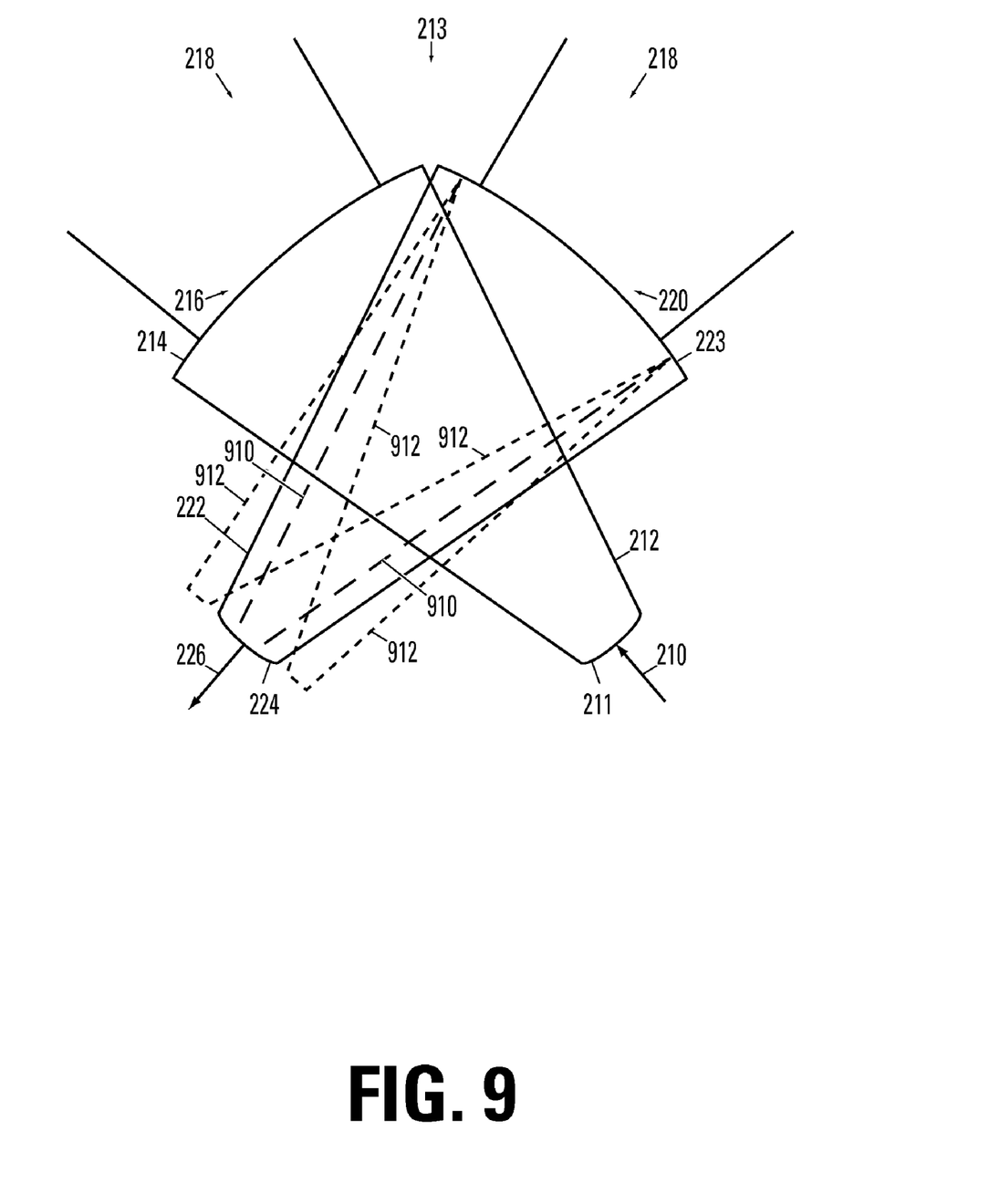

Returning to FIG. 4, the input and output beams crossing within the slab region 213 do not interact with each other. The various waveguides therefore can be disposed and oriented so that the beams cross at any angle, as long as none of the input light strikes any of the output receivers directly, and virtually none of the output light strikes any of the input waveguides directly. The latter condition is illustrated better in FIG. 9, which is a copy of FIG. 4 on which the focusing of the output beam from the waveguide array 218 onto the far border 224 of the output slab region 213 has been drawn in. Due to the grating effect of the waveguide array 218, numerous images will form on the far border off the slab region. Dashed lines 910 in FIG. 9 illustrate the focusing of the main image, and dotted lines 912 illustrate the focusing of the first order (ghost) image on either side of the main image. The first order image on either side of the main image is already much weaker, and the second order image (not shown) on either side of the main image is so much weaker that it is virtually nonexistent. In the embodiment of FIGS. 2, 3 and 4, therefore, the condition that virtually none of the output light strikes any of the input waveguides directly, is satisfied by ensuring that neither the main image nor the first order images strike any of the input waveguides directly. In other more sensitive embodiments, the condition may require ensuring that the second order images on either side of the main image, or even some higher order images, do not strike any of the input waveguides directly.

The shared slab region 213 in FIG. 4 has a shape defined by the union of a conventional shape for an input slab region 212 and a conventional shape for an output slab region 222. In actuality the borders of the slab shape play no part in the propagation of optical energy across it, so long as the border does not have any irregularities within the area occupied by the two beams. In fact, in another embodiment the "slab region" 213 has no borders at all. Instead the input waveguides 210 come into a particular region of the chip having vertical-only confinement, and terminate there. The input end 216 of the waveguide array 218 is disposed at the correct distance across this region of vertical-only confinement, and oriented to receive the input optical energy from the input waveguides 210. Similarly, the output end 220 of the waveguide array 218 comes into the vertical-only confinement region of the chip and terminates there. The output end 220 of the waveguide array 218 is oriented to project its output optical energy beam in a direction that crosses the input beam. The receivers of the output waveguides 226 are then disposed at the correct distance across the region of vertical-only confinement, and oriented to receive the output optical energy from the waveguide array 218 after it has crossed the input beam. Since the spreading and focusing of light at a particular distance from the output of the input waveguides 210 or the waveguide array 218 depend on physical principles and not on any interaction with the borders of the vertical-only confinement region 213, no borders are necessary at all.

Figure 10:
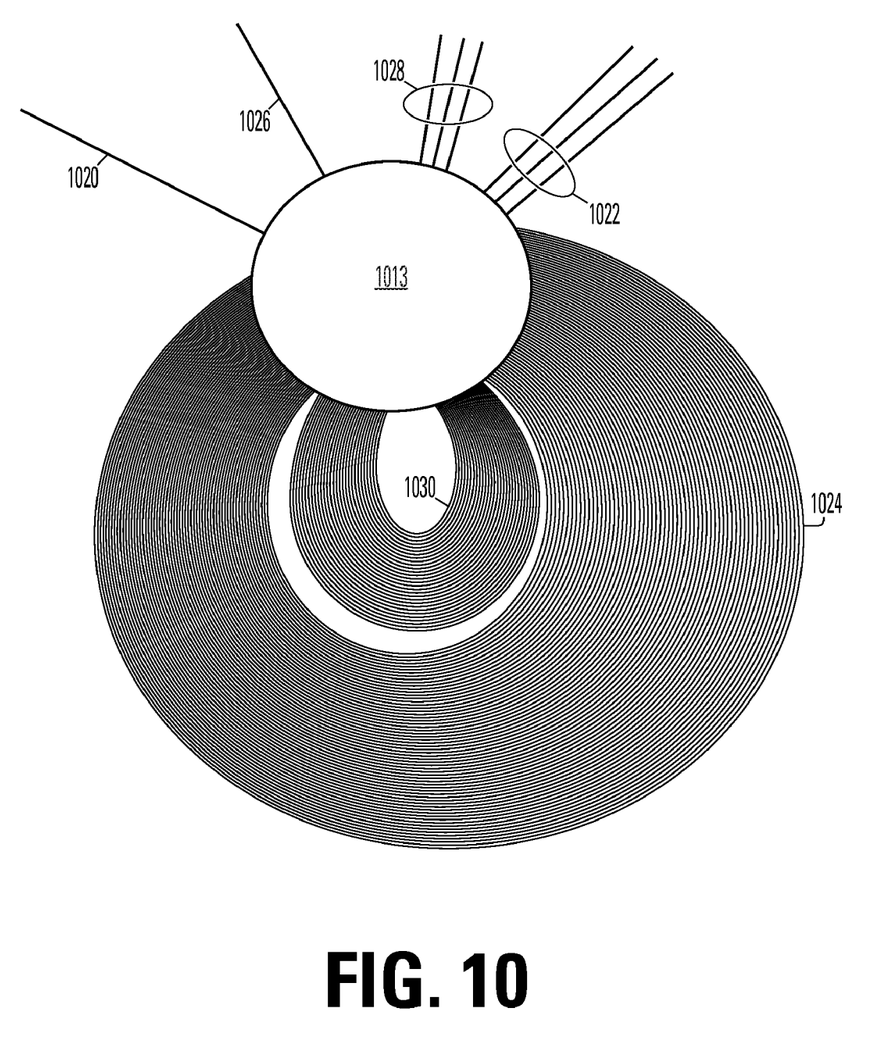
FIG. 10 illustrates an embodiment in which two independent AWG's share a single common slab region for both the input and output beams.

Also, it will be appreciated that the same confinement region can also be shared among more than one AWG. FIG. 10 illustrates an embodiment in which two independent AWG's share a single common slab region 1013 for both the input and output beams. The first AWG includes the slab region 1013, input waveguide 1020, output waveguides 1022, and waveguide array 1024. The second AWG includes the slab region 1013, input waveguide 1026, output waveguides 1028, and waveguide array 1030. A total of four beams cross each other within the slab region 1013: the input and output beams for the first AWG and the input and output beams for the second AWG. Many other variations will be apparent.

Figure 11:
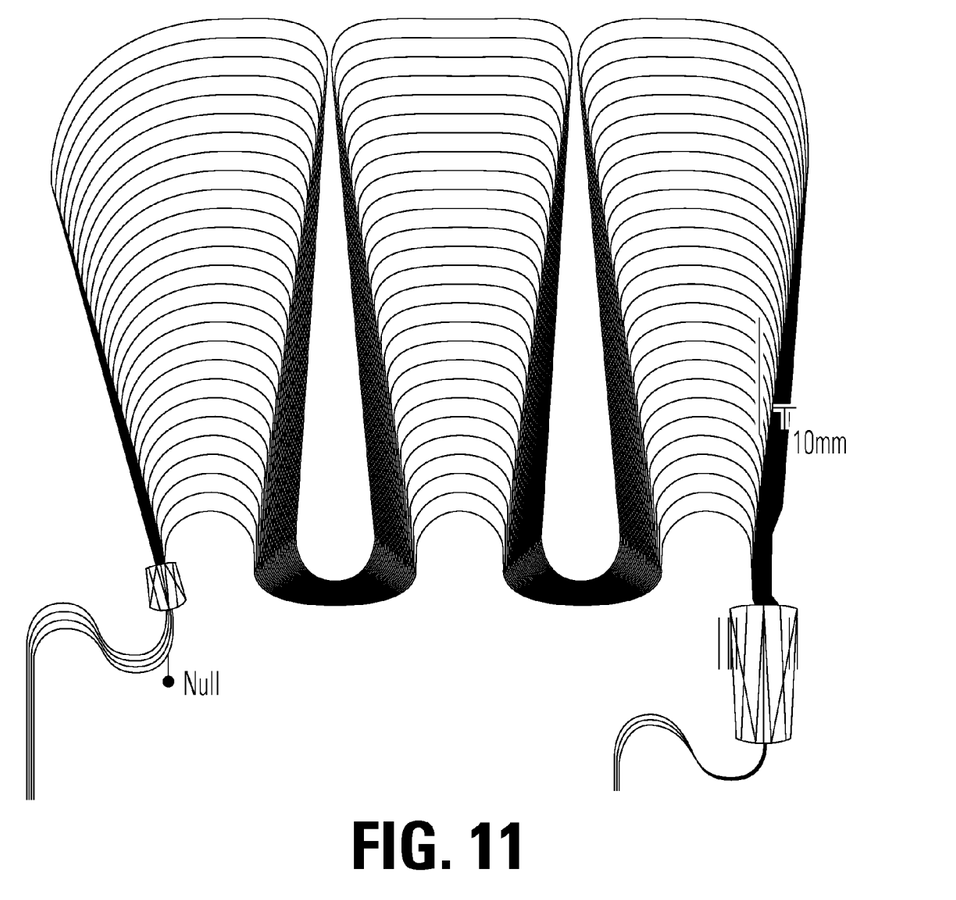
FIG. 11 illustrates another conventional AWG layout.

FIG. 11 illustrates a conventional AWG for use with a very small FSR, for example equal to a channel spacing of 100 GHz. Such an AWG can result in a very large ΔL of approximately 2 mm between adjacent branches of the waveguide array. Such a large ΔL usually requires a serpentine shape for the waveguide array such as that shown in FIG. 11, in order to fit the AWG on a die of reasonable size.

Figure 12:
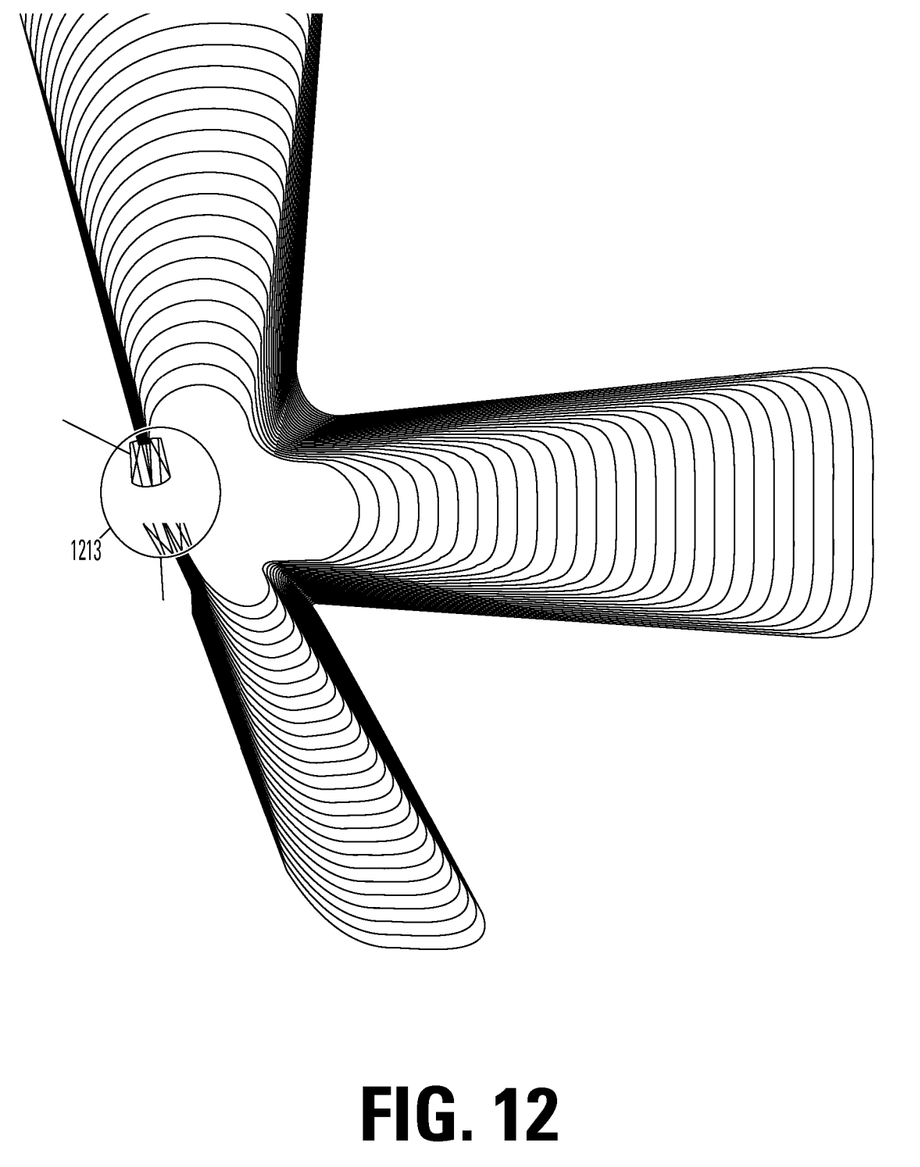
FIG. 12 illustrates a modification of the AWG of FIG. 11 incorporating features of the invention.

FIG. 12 illustrates a modification of the AWG of FIG. 11 incorporating features of the invention. In the AWG of FIG. 12, the input and output beams cross each other within a shared slab region 1213, thereby greatly reducing the size of the device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. Apparatus comprising:
a first arrayed waveguide grating having a first waveguide array and a region of vertical-only confinement that is shared for both input and output beams of the first waveguide array, the input and output beams to and from the first waveguide array crossing each other within the region of vertical-only confinement; and
a second arrayed waveguide grating having a second waveguide array, input and output beams to and from the second waveguide array crossing each other and further crossing at least one of the input and output beams to and from the first waveguide array within the region of vertical-only confinement.

2. Apparatus comprising a first waveguide grating having:
a first input set of at least one optical waveguide disposed and oriented to deliver input optical energy into a region of vertical-only confinement;
a first waveguide array having an input end disposed and oriented to receive optical energy from the first input set of at least one optical waveguide after passage across the region of vertical-only confinement, the first waveguide array further having an output end disposed and oriented to deliver optical energy into the region of vertical-only confinement; and
a first output set of at least one optical waveguide disposed and oriented to receive optical energy from the output end of the first waveguide array after passage across the region of vertical-only confinement,
wherein at least one of the first input and first output sets of optical waveguides includes more than one waveguide,
and wherein the optical energy passing across the region of vertical-only confinement from the first input set of at least one optical waveguide to the input end of the first waveguide array crosses the optical energy passing across the region of vertical-only confinement from the output end of the first waveguide array to the first output set of at least one optical waveguide,
the apparatus further comprising a second arrayed waveguide grating having:
a second input set of at least one optical waveguide disposed and oriented to deliver input optical energy into the region of vertical-only confinement;
a second waveguide array having an input end disposed and oriented to receive optical energy from the second input set of at least one optical waveguide after passage across the region of vertical-only confinement, the second waveguide array further having an output end disposed and oriented to deliver optical energy into the region of vertical-only confinement; and
a second output set of at least one optical waveguide disposed and oriented to receive optical energy from the output end of the second waveguide array after passage across the region of vertical-only confinement,
wherein at least one of the second input and output sets of optical waveguides includes more than one waveguide,
and wherein the optical energy passing across the region of vertical-only confinement from the second input set of at least one optical waveguide to the input end of the second waveguide array crosses the optical energy passing across the region of vertical-only confinement from the output end of the second waveguide array to the second output set of at least one optical waveguide, and further crosses at least one of the group consisting of (a) the optical energy passing across the region of vertical-only confinement from the first input set of at least one optical waveguide to the input end of the first waveguide array, and (b) the optical energy passing across the region of vertical-only confinement from the output end of the first waveguide array to the first output set of at least one optical waveguide.

3. Apparatus according to claim 1, wherein the second waveguide array is nested with the first waveguide array.

4. Apparatus according to claim 2, wherein the second waveguide array is nested with the first waveguide array.

* * * * *